(12) United States Patent
Sasaki

(10) Patent No.: US 8,384,833 B2
(45) Date of Patent: Feb. 26, 2013

(54) TELEVISION AND ELECTRONIC DEVICE

(75) Inventor: Kazuyoshi Sasaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/107,113

(22) Filed: May 13, 2011

(65) Prior Publication Data

US 2012/0057085 A1 Mar. 8, 2012

(30) Foreign Application Priority Data

Sep. 7, 2010 (JP) .................. 2010-200043

(51) Int. Cl.
H04N 5/64 (2006.01)

(52) U.S. Cl. ....................................... 348/836

(58) Field of Classification Search ........................ None
See application file for complete search history.

(56) References Cited

U.S. PATENT DOCUMENTS 5,528,458 A * 6/1996 Yasuho et al. ................ 361/718
5,694,294 A * 12/1997 Ohashi et al. ............ 361/679.48
2007/0146544 A1 * 6/2007 Liu et al. ...................... 348/553

FOREIGN PATENT DOCUMENTS

| JP | 11-153970 | 6/1999 |
|---|---|---|
| JP | 2002-162550 | 6/2002 |
| JP | 2005-037772 | 2/2005 |
| JP | 2008-071919 | 3/2008 |
| JP | 2008096745 | 4/2008 |

* cited by examiner

Primary Examiner — Nhon Diep
(74) Attorney, Agent, or Firm — Blakely, Sokoloff, Taylor & Zafman LLP

(57) ABSTRACT

According to one embodiment, a television includes a housing includes a light-transmitting portion, a control part provided on an inner surface of the housing, a first light-emitting diode provided on the inner surface of the housing and configured to emit light towards the light-transmitting portion as controlled by the control part and a wiring provided on the inner surface of the housing and configured to connect the control part and the first light-emitting diode to each other.

21 Claims, 5 Drawing Sheets

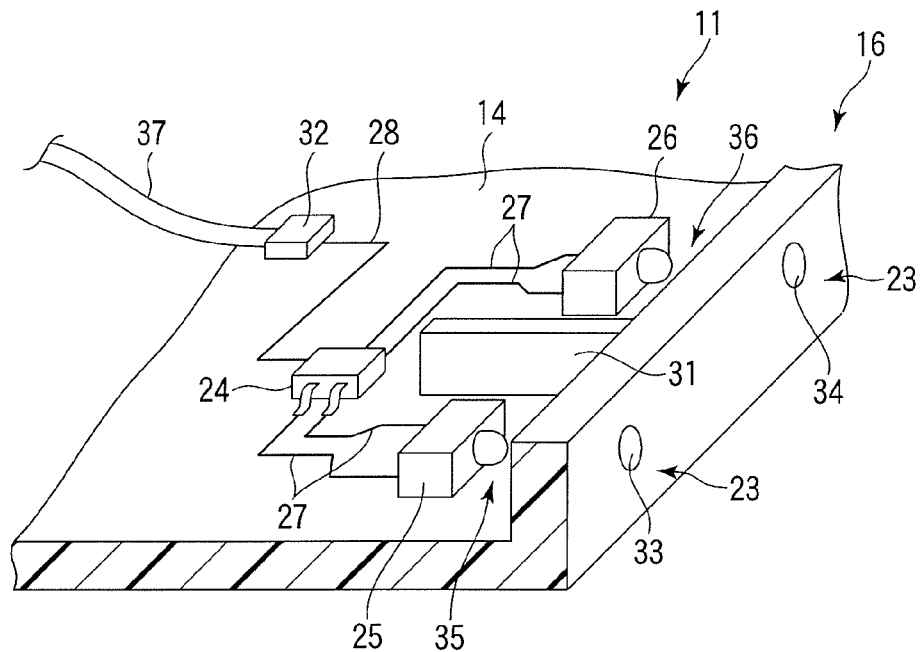
F I G. 2
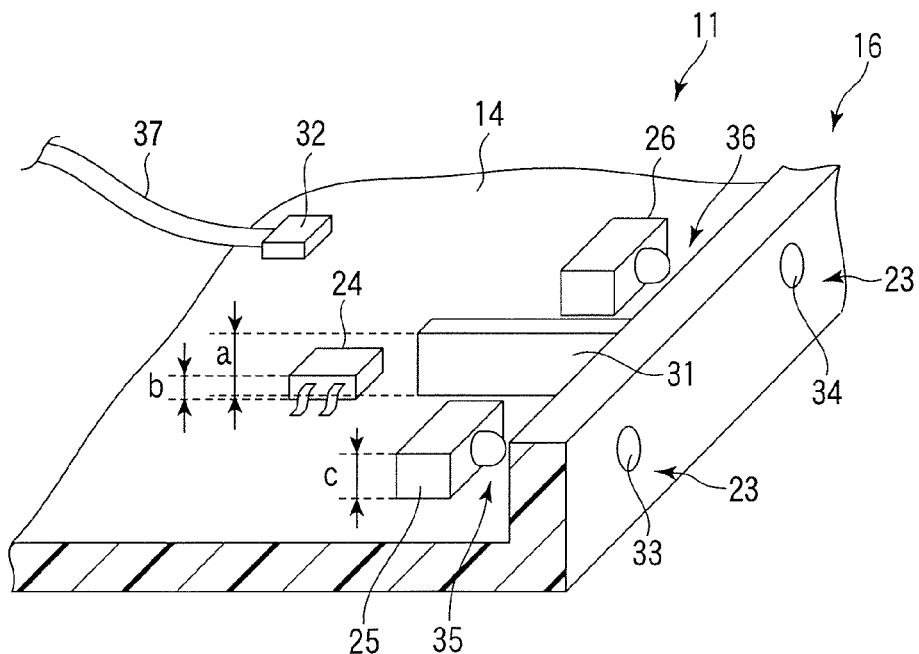
F I G. 3

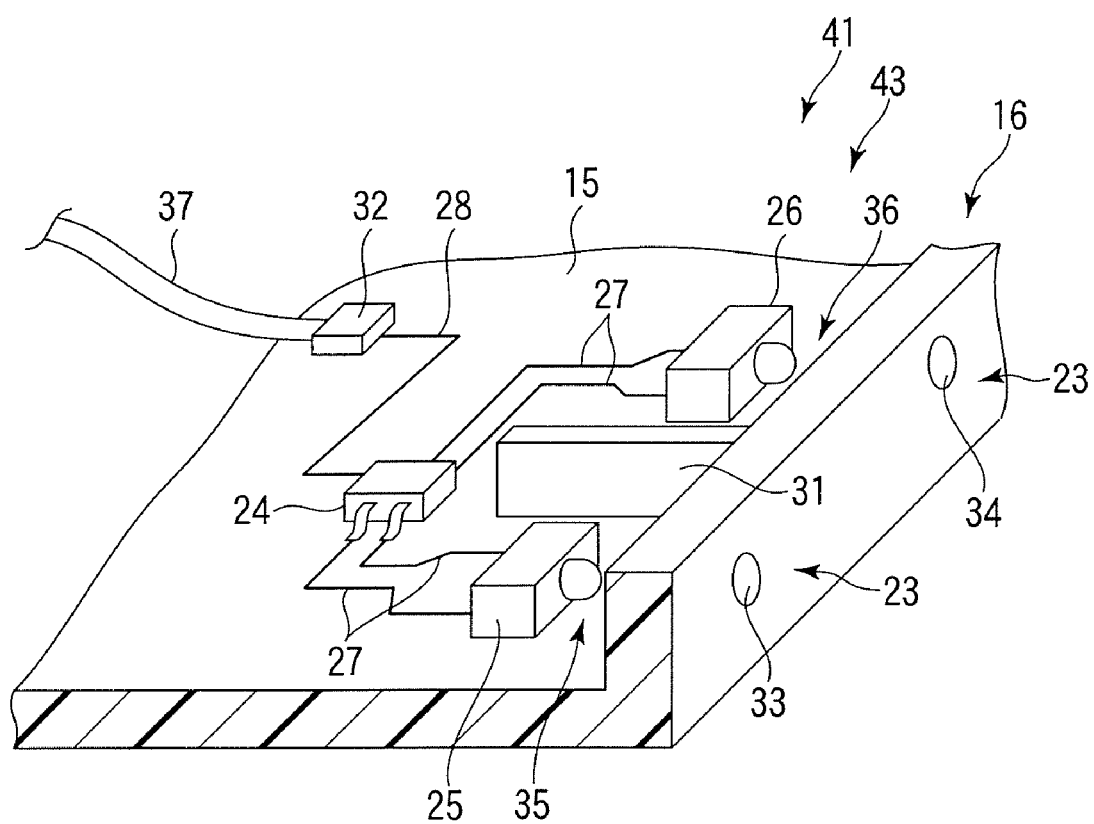
F I G. 7

TELEVISION AND ELECTRONIC DEVICE

CROSS-REFERENCE TO RELATED APPLICATIONS

This application is based upon and claims the benefit of priority from Japanese Patent Application No. 2010-200043, filed Sep. 7, 2010; the entire contents of which are incorporated herein by reference.

FIELD

Embodiments described herein relate generally to a thin-profile television comprising a display panel.

BACKGROUND

For example, a status indicator which employs a lamp such as an LED is provided on an electronic device such as television in many cases to indicate a status of the electronic device such as ON or OFF of the power. Further, such a status indicator is used in some cases to notify a status to the user by lighting up the lamp when, for example, a built-in optical disk drive is being in operation.

As described above, the status indicator is a basic structure employed in a great number of types of electronic devices including televisions. Therefore, there are always the needs of improvements in terms of, for example, a lower cost with regard to the status indicator.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary perspective enlarged view showing a vicinity of a status indicator of the television shown in FIG. 1;

FIG. 3 is an exemplary perspective view showing a height of each of a first light-emitting diode, a control part, and a second rib in the status indicator shown in FIG. 2;

FIG. 7 is an exemplary perspective enlarged view showing a vicinity of a status indicator of the portable computer shown in FIG. 6.

DETAILED DESCRIPTION

Various embodiments will be described hereinafter with reference to the accompanying drawings.

In general, according to one embodiment, a television includes a housing includes a light-transmitting portion, a control part provided on an inner surface of the housing, a first light-emitting diode provided on the inner surface of the housing and configured to emit light towards the light-transmitting portion as controlled by the control part and a wiring provided on the inner surface of the housing and configured to connect the control part and the first light-emitting diode to each other.

Figure 1:
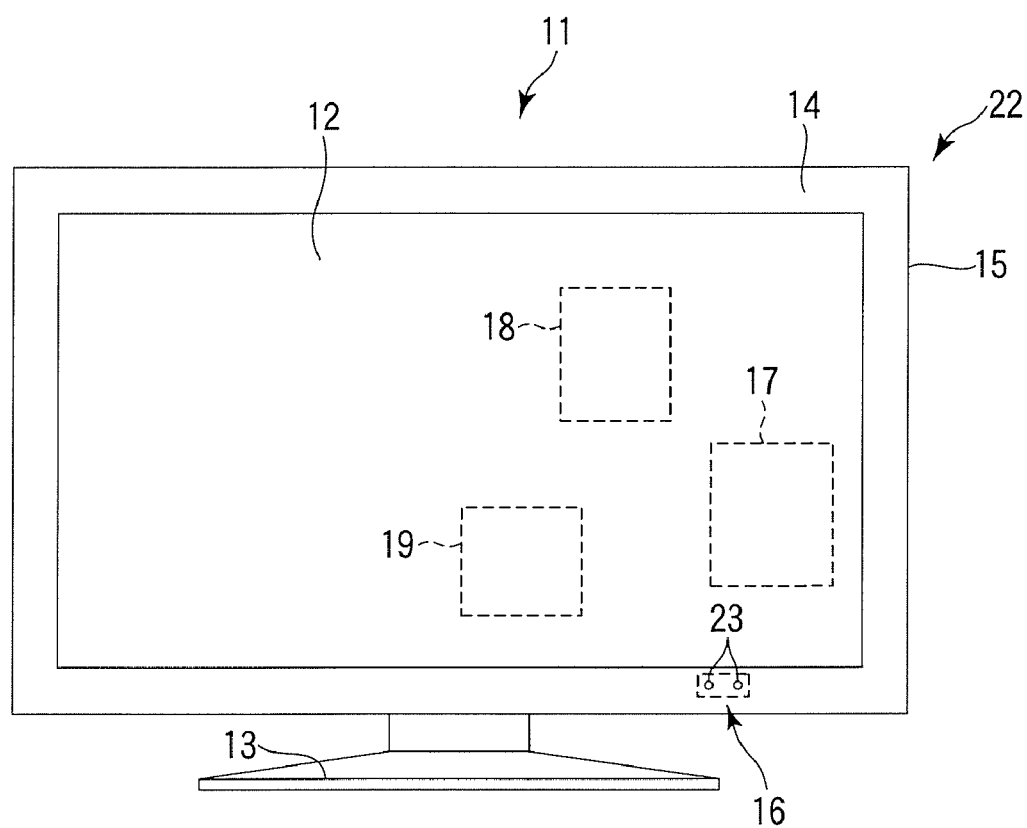
FIG. 1 is an exemplary front view showing a television, which is an example of an electronic device according to the first embodiment.

An embodiment of a television, which is an example of the electronic devices, will now be described with reference to FIGS. 1 to 3. As shown in FIG. 1, a television 11 according to this embodiment is a thin-profile display apparatus having a rectangular appearance. As shown in FIGS. 1 and 2, the television 11 comprises, for example, a display panel 12, a stand 13 (leg portion) which supports the display panel 12, a frame-shaped mask 14 which covers a front side of the display panel 12, a cover 15 which covers a back surface of the display panel 12, a status indicator 16 provided at a location of the mask 14, a system board 17 which is connected to the display panel 12 and overall controls the entire television 11, a tuner board 18 and a power circuit 19. The system board 17, the tuner board 18 and the power circuit 19 are each secured to the back surface of the display panel 12. The mask 14 and the cover 15 form a housing 22 which is an enclosure of the television 11.

In this embodiment, the display panel 12 is a liquid crystal panel having a square plate shape. The display panel 12 may be some other type of display panel such as a plasma display panel or an organic EL panel. Further, the television 11 of this embodiment does not include a frame or the like, which serves as its backbone in its central portion, but the display panel 12 itself serves as a reinforcement member which maintains the upright position of the television.

The status indicator 16 turns on or off the lamp of a light-emitting diode (LED) to notify the user of, for example, an ON or OFF status of the power. The status indicator 16 is provided at, for example, a lower end of the mask 14. As shown in FIG. 2, the status indicator 16 comprises a light transmitting portion 23 provided to be transparent at a portion of the mask 14, a control part 24 provided on an inner surface of the mask 14, a first light-emitting diode 25 and a second light-emitting diode 26 provided on the inner surface of the mask 14, a first wiring 27 and a second wiring 28 provided on the inner surface of the mask 14, a second rib 31 which projects from the inner surface of the mask 14 such as to partition the first light-emitting diode 25 and the second light-emitting diode 26 from each other, and a connector 32 provided on the inner surface of the mask 14.

The light transmitting portion 23 comprises a first lens 33 corresponding to the first light-emitting diode 25 and a second lens 34 corresponding to the second light-emitting diode 26. The first lens 33 and the second lens 34 are transparent and they are each provided to be put through the cover 15.

The control part 24 is an element which directly controls the turning on and off of each of the first light-emitting diode 25 and the second light-emitting diode 26. It should be noted here that in this embodiment, there is only one control part 24 provided as a representative example; however the embodiment is not limited to this, but there may be a plurality of control parts 24. The control part 24 is fixed onto the inner surface of the mask with an insulating adhesive or the like.

The first light-emitting diode 25 and the second light-emitting diode 26 are of the so-called lateral light emission type diodes, and they are fixed onto the inner surface of the mask with an insulating adhesive or the like. The first light-emitting diode 25 and the second light-emitting diode 26 are controlled by the control part 24 to emit light towards the light transmitting portion 23. The first light-emitting diode 25 is turned on while, for example, the power of the television 11 is on, whereas it is turned off while the power is off. In the meantime, the second light-emitting diode 26 is turned on when, for example, the built-in optical disk drive is operating, whereas it is off when the optical disk drive is not in operation.

The second rib 31 projects from the inner surface of the mask 14 towards an inner side of the housing 22, and it is formed to be integrated with the mask 14. The second rib 31 partitions a first path 35 running from the first light-emitting diode 25 to the light transmitting portion 23 and a second path 36 running from the second light-emitting diode 26 to the light transmitting portion 23 from each other.

As shown in FIG. 3, a height a of the second rib 31 is larger than a height b of the control part 24. Similarly, the height a of the second rib 31 is larger than a height c of the first light-emitting diode 25 and the second light-emitting diode 26. With this structure, it is possible to prevent light emitted from either one of the first light-emitting diode 25 and the second light-emitting diode 26 from heading towards the other one, causing leakage of light.

As shown in FIG. 2, the connector 32 is connected to the system board 17 via, for example, a flexible cable 37. Thus, for example, the power can be supplied from the system board 17. The second wiring 28 connects the connector 32 and the control part 24 to each other. The connector 32 is fixed onto the inner surface of the mask 14 with an insulating adhesive or the like.

The first wiring 27 connects the control part 24 and the first light-emitting diode 25 to each other, and the control part 24 and the second light-emitting diode 26 to each other. The second wiring 28 connects the control part 24 and the connector 32 to each other. The first wiring 27 and the second wiring 28 are each formed of an electro-conductive adhesive applied onto the inner surface of the mask 14 into a predetermined pattern. In other words, the first wiring 27 and the second wiring 28 adhere to the inner surface of the mask 14.

The electro-conductive adhesive, which gives rise to the first wiring 27 and the second wiring 28, is applied with, for example, a robot-type dispenser. Alternatively, the application of the electro-conductive adhesive may be performed with a hand-operated type dispenser.

The manufacture of the status indicator 16 of this embodiment will now be described. First, the electro-conductive adhesive is applied onto the inner surface of the mask with, for example, a dispenser, and thus the first wiring 27 and the second wiring 28 are formed. Similarly, a non-electro-conductive, or insulating adhesive is applied in advance with, for example, a dispenser to the respective positions on the mask 14 as well, where the control part 24, the first light-emitting diode 25, the second light-emitting diode 26 and the connector 32 are mounted.

Then, at the predetermined positions on the mask 14, the control part 24, the first light-emitting diode 25 and the second light-emitting diode 26 are mounted. Here, before the hardening of the electro-conductive adhesive, the control part 24, the first light-emitting diode 25, the second light-emitting diode 26 and the connector 32 are mounted. In this manner, electrical connection between each of the control part 24, the first light-emitting diode 25, the second light-emitting diode 26 and the connector 32 and the electro-conductive adhesive is ensured. Further, with the insulating adhesive, the physical fixation between the control part 24 and the mask 14, between the first light-emitting diode 25 and the mask 14, between the second light-emitting diode 26 and the mask 14 and between the connector 32 and the mask 14 is secured.

The manufacture process of the status indicator 16 is not limited to that described above, but the following process may be alternatively employed. For example, the control part 24, the first light-emitting diode 25, the second light-emitting diode 26 and the connector 32 are fixed to the respective predetermined positions on the mask 14 with an insulating adhesive or the like, and thereafter, the electro-conductive adhesive is applied with a dispenser or the like to form the first wiring 27 and the second wiring 28.

According to the first embodiment, the television 11 comprises the housing 22 comprising the light transmitting portion 23, the control part 24 provided on the inner surface of the housing 22, the first light-emitting diode 25 provided on the inner surface of the housing 22 and emitting light towards the light transmitting portion 23 as it is controlled by the control part 24, and the wiring provided on the inner surface of the housing 22 and connecting the control part 24 and the first light-emitting diode 25 to each other. With this structure, it becomes not necessary to provide a printed wiring board by which the first light-emitting diode 25 and the control part 24 are mounted, but these members are mounted directly on the inner surface of the housing 22. Thus, the production cost can be cut down. Further, the housing 22 can be made smaller in size by the thickness of the printed wiring board.

Further, when mounting parts using a printed wiring board, screws are used in many usual cases for fixing the printed wiring board to the housing 22. In these cases, due to the tolerance of screw holes made in the printed wiring board and the tolerance of screw holes made in the housing 22, the position where the printed wiring board is set is displaced sometimes. In such a case, the positions of the first light-emitting diode 25 and the second light-emitting diode 26 are displaced, thereby causing such a state where light from the first light-emitting diode 25 and the second light-emitting diode 26 cannot be easily visually recognized through the light transmitting portion 23.

This embodiment comprises a structure in which a printed wiring board is not employed, and therefore the accuracy of the installation positions of the first light-emitting diode 25 and the second light-emitting diode 26 can be improved. Further, solder is not employed for the electric connection portions of the control part 24 and the first light-emitting diode 25, but an electro-conductive adhesive is employed. For this reason, heat history of, for example, about 260° C. is never applied to these parts for the object of melting the solder. Thus, the possibility of causing degradation in the performance of the control part 24 and the first light-emitting diode 25 by the heat history can be lowered. Further, for a similar reason, the heat-proof conditions of the control part 24 and the first light-emitting diode 25 can be relaxed, thereby making it possible to employ low-cost parts. In this manner, the product cost can be further reduced.

Further, the television 11 comprises the second light-emitting diode 26 provided on the inner surface of the housing 22 and emitting light towards the light transmitting portion 23 as it is controlled by the control part 24, and the second rib 31 which projects from the housing 22 so as to partition the first path 35 running from the first light-emitting diode 25 to the light transmitting portion 23 and the second path 36 running from the second light-emitting diode 26 to the light transmitting portion 23 from each other. With this structure, the first path 35 and the second path 36 are partitioned from each other by the second rib 31 which projects from the housing 22. Therefore, it is possible to prevent such a problem that light emitted from the first light-emitting diode 25 leaks in the direction where the second light-emitting diode 26 is located.

Further, with the above-described structure, there is no need to separately provide a resin-made shade to partition the first light-emitting diode 25 and the second light-emitting diode 26 from each other and further to cover the surrounding of these members to prevent leakage of light. Thus, the number of parts can be reduced. It should be noted here that in recent years, the peripheral structures of the light-emitting diodes have been further downsized, and therefore it has become difficult to mold the shades, thereby causing an increase in product cost. With the above-described structure, it is not only possible to omit the shade for a lower production cost, but also to omit the process for attaching the shade. Thus, this embodiment is advantageous in these respects particularly.

Figure 4:
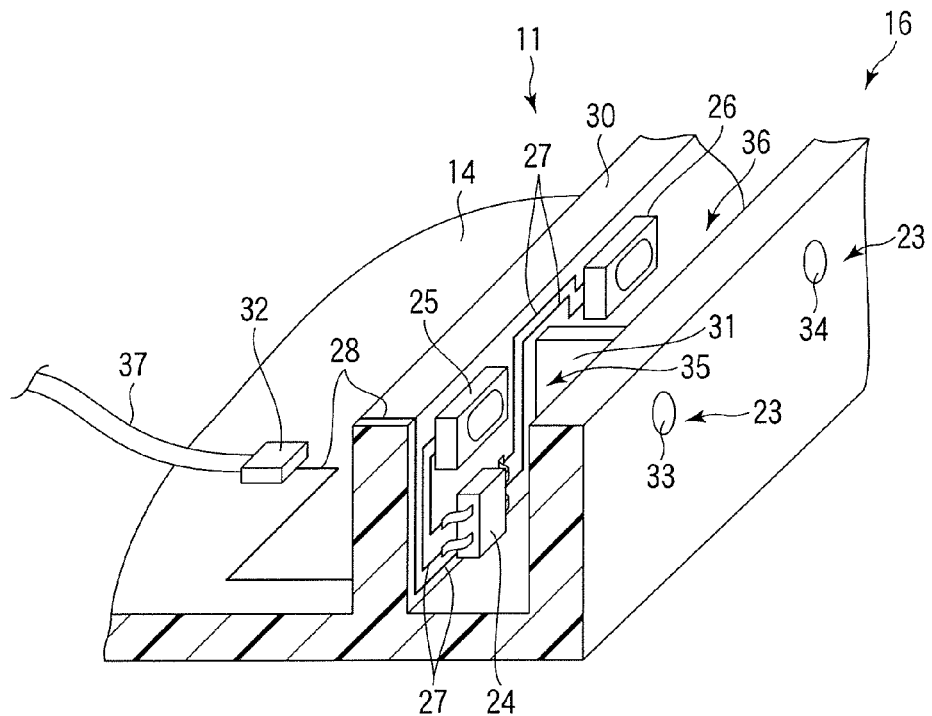
FIG. 4 is an exemplary perspective enlarged view showing a vicinity of a status indicator of a television, which is an example of an electronic device according to the second embodiment.

Next, the second embodiment of the electronic device will now be described with reference to FIG. 4. A television 11, which is an example of the electronic device according to the second embodiment is similar to that of the first embodiment in main structure. Therefore, the portions different from those of the first embodiment will be mainly described. Here, the common parts will be designated by the same reference symbol and explanations therefore will be omitted.

A status indicator 16 of the second embodiment comprises a first rib 30 which projects from a mask 14, light transmitting portions 23 provided to be transparent at portions of the mask 14, a control part 24 provided on a surface of the first rib 30, a first light-emitting diode 25 and a second light-emitting diode 26 provided on the surface of the first rib 30, a first wiring 27 and a second wiring 28 provided on the surface of the first rib 30, a second rib 31 which projects from the inner surface of the mask 14 such as to partition the first light-emitting diode 25 and the second light-emitting diode 26 from each other, and a connector 32 provided on the inner surface of the mask 14. The light transmitting portions 23 are provided in pair, and the pair of the light transmitting portions 23 comprise transparent lenses 33 and 34, respectively, provided to be put through the mask 14. It should be noted that the connector 32 may be provided on the surface of the first rib 30.

The first wiring 27 and the second wiring 28 are each formed of an electro-conductive adhesive applied onto the inner surface of the mask 14 into a predetermined pattern. A portion of the second wiring 28 is provided not only on the surface of the first rib 30 but also on the inner surface of the mask 14.

The control part 24 is fixed to the surface of the first rib 30. The first light-emitting diode 25 and the second light-emitting diode 26 can emit light towards the light transmitting portions 23 as they are controlled by the control part 24. The first light-emitting diode 25 and the second light-emitting diode 26 are fixed to the surface of the first rib 30.

The first rib 30 projects from the inner surface of the mask 14 towards the inner side of the housing 22, and is molded to be integrated with the mask 14. The second rib 31 partitions the first path 35 running from the first light-emitting diode 25 to the light transmitting portion 23 and the second path 36 running from the second light-emitting diode 26 to the light transmitting portion 23 from each other. The first light-emitting diode 25 and the second light-emitting diode 26 are of the so-called top light emission type diodes. The neighborhoods of the first light-emitting diode 25 and the second light-emitting diode 26 are surrounded by the first rib 30 and the second rib 31. With this structure, leakage of light from the first light-emitting diode 25 and the second light-emitting diode 26 can be further prevented.

According to the second embodiment, the television 11 comprises the housing 22 comprising the light transmitting portions 23, the first rib 30 which projects from the housing 22 towards the inner side of the housing 22, the control part 24 provided on the surface of the first rib 30, the first light-emitting diode 25 provided on the surface of the first rib 30 and emitting light towards the respective light transmitting portion 23 as it is controlled by the control part 24, and the wiring provided on the surface of the first rib 30 and connecting the control part 24 and the first light-emitting diode 25 to each other.

With this structure, in which all of the control part 24, the first light-emitting diode 25 and the wiring are provided on the surface of the first rib 30, if a pressure (stress) is applied to the housing 22 with, for example, a hand or a finger of the user, the breakage of the wiring, the breakage of the contact between the control part 24 and the first light-emitting diode 25, the breakage of the electrical connection between the control part 24 and the wiring or the electrical connection between the first light-emitting diode 25 and the wiring, or the like does not occur. Thus, the reliability of the first light-emitting diode 25 can be improved.

Figure 5:
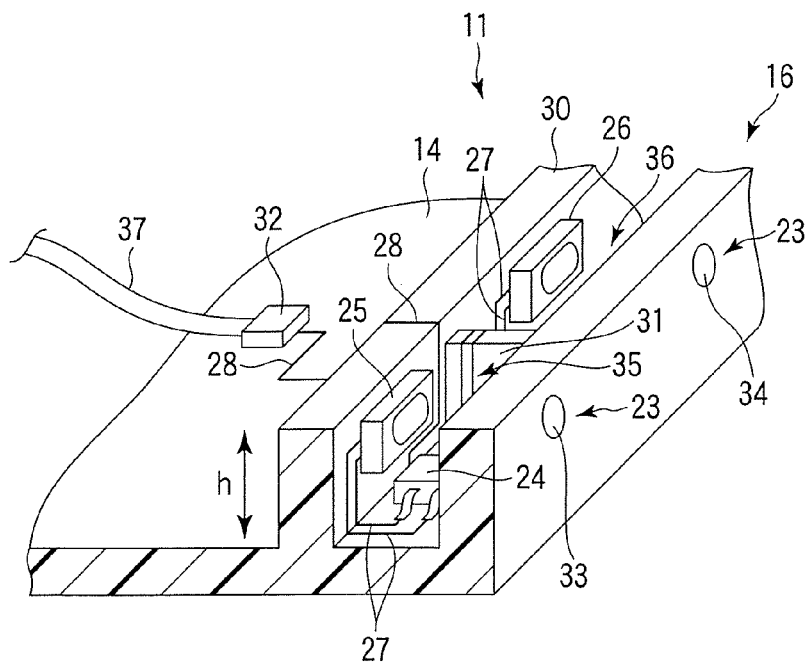
FIG. 5 is an exemplary perspective enlarged view showing a vicinity of a status indicator of a television, which is an example of an electronic device according to the third embodiment.

Next, the third embodiment of the electronic device will now be described with reference to FIG. 5. A television 11, which is an example of the electronic device according to the third embodiment is similar to that of the first embodiment in main structure. Therefore, the portions different from those of the first embodiment will be mainly described. Here, the common parts will be designated by the same reference symbol and explanations therefore will be omitted.

A status indicator 16 comprises a first rib 30 which projects from a mask 14, light transmitting portions 23 provided to be transparent at portions of the mask 14, a control part 24 provided on an inner surface of the mask 14, a first light-emitting diode 25 and a second light-emitting diode 26 provided on the surface of the first rib 30, a first wiring 27 and a second wiring 28 provided on the inner surface of the mask 14 over onto the surface of the first rib 30, a second rib 31 which projects from the inner surface of the mask 14 such as to partition the first light-emitting diode 25 and the second light-emitting diode 26 from each other, and a connector 32 provided on the inner surface of the mask 14. The light transmitting portions 23 are provided in pair, and the pair of the light transmitting portions 23 comprise transparent lenses 33 and 34, respectively, provided to be put through the mask 14.

The first rib 30 projects from the inner surface of the mask 14 towards the inner side of the housing 22, and is molded to be integrated with the mask 14. The first light-emitting diode 25 and the second light-emitting diode 26 are of the so-called top light emission type diodes. The control part 24 is fixed to the inner surface of the mask 14. The first light-emitting diode 25 and the second light-emitting diode 26 are fixed to the surface of the first rib 30. The first light-emitting diode 25 and the second light-emitting diode 26 are controlled by the control part 24 to emit light towards the light transmitting portions 23, respectively.

The first wiring 27 and the second wiring 28 are each formed of an electro-conductive adhesive applied onto the inner surface of the mask 14 into a predetermined pattern. The second rib 31 partitions the first path 35 running from the first light-emitting diode 25 to the light transmitting portion 23 and the second path 36 running from the second light-emitting diode 26 to the light transmitting portion 23 from each other.

According to the third embodiment, the television 11 comprises the housing 22 comprising the light transmitting portions 23, the first rib 30 which projects from the housing 22 towards the inner side of the housing 22, the control part 24 provided on the inner side of the housing 22, the first light-emitting diode 25 provided on the surface of the first rib 30 and emitting light towards the respective light transmitting portion 23 as it is controlled by the control part 24, and the wiring provided on the inner side of the housing 22 and the surface of the first rib 30 and connecting the control part 24 and the first light-emitting diode 25 to each other. With this structure, in which the first light-emitting diode 25 is provided on the surface of the first rib 30, if a pressure (stress) is applied to the housing 22, the breakage of the contact of the first light-emitting diode 25 or the like can be prevented. Further, the control part 24 is provided on the inner surface of the housing 22. With this structure, a height h of the first rib 30 can be reduced as compared to the case where both the first light-emitting diode 25 and the control part 24 are placed on the first rib 30 as in the second embodiment. In this manner, the space necessary to install the first light-emitting diode 25 and the control part 24 can be made smaller, thereby making it possible to achieve a high-density mounting of these members. It should be noted, as discussed above, that the height h of the first rib 30 can be reduced, and therefore the structure of this embodiment can be suitably applied for devices for which there is a great demand of reducing the height, for example, portable computers, etc.

Figure 6:
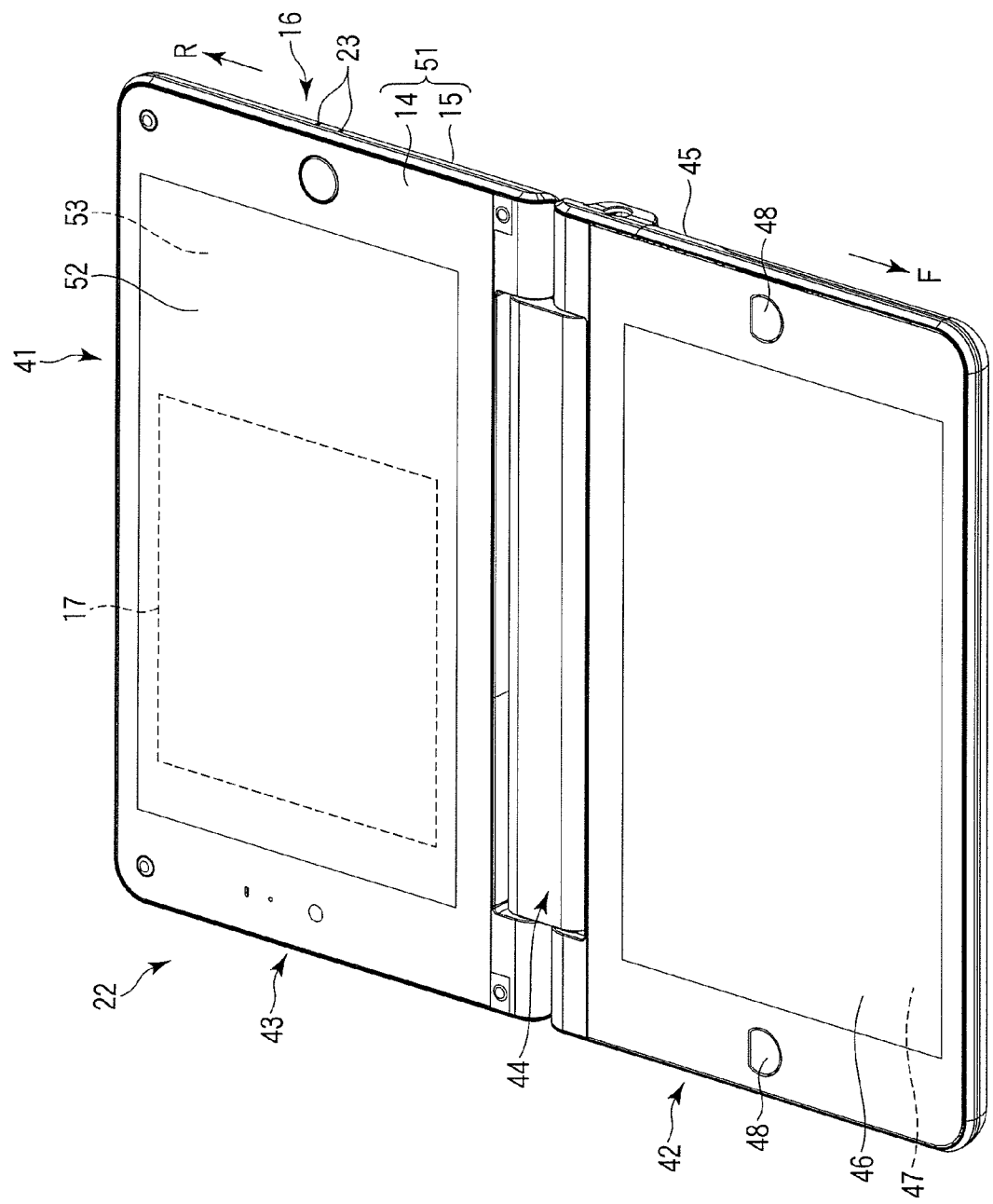
FIG. 6 is an exemplary perspective enlarged view showing a vicinity of a status indicator of a portable computer, which is an example of an electronic device according to the fourth embodiment.

With reference to FIGS. 6 and 7, the fourth embodiment of the electronic device will now be described. A portable computer 41, which is an example of the electronic device according to the third embodiment is different in appearance from the first embodiment, but similar to the first embodiment in the main structure of the surroundings of the first light-emitting diode 25. Therefore, the portions different from those of the first embodiment will be mainly described. Here, the common parts will be designated by the same reference symbol and explanations therefore will be omitted. In the following embodiment, the front side (that is, the user's side) is defined as the front side F, the away side as viewed by the user is defined as the rear side R, the left-hand side as viewed from the user is defined as the left side, the right-hand side as viewed from the user is defined as the right side, the upper side as viewed from the user is defined as the top side, and the lower side as viewed from the user is defined as the bottom side.

As shown in FIG. 6, the portable computer 41 comprises a first unit 42 located on the front side in the figure, a second unit 43 located in the rear side of the figure, and a hinge unit 44 located between the first unit 42 and the second unit 43 such as to connect them together to be rotatable.

The first unit 42 comprises a first case 45, a first touch panel 46 mounted on the first case 45, and a first display 47 provided underneath the first touch panel 46 and inside the first case 45. The first display 47 is, for example, a liquid crystal display and is provided at a position adjacent to the first touch panel 46. Further, the first unit 42 comprises a pair of operation buttons 48 at both sides which interpose the first touch panel 46 therebetween.

As shown in FIG. 6, the second unit 43 comprises a second case 51, a second touch panel 52 mounted on the second case 51, and a second display 53 provided underneath the second touch panel 52 and inside the second case 51. As shown in FIG. 6, the second case 51 further comprises a frame-like mask 14 which covers a front side of the second touch panel 52 and a cover 15 which covers a rear surface of the second display 53. The first case 45 and the second case 51 form a housing 22 which gives rise to an enclosure of the portable computer 41. The second unit 43 further comprises a system board 17 on which a CPU and the like are mounted, and a status indicator 16 which displays the operation status of the portable computer 41 to the user.

The status indicator 16 turns on or off the lamp of a light-emitting diode (LED) to notify the user of, for example, an ON or OFF status of the power, or the status of the wireless LAN communication, etc. As shown in FIG. 7, the status indicator 16 comprises a light transmitting portion 23 provided to be transparent at a portion of the cover 15, a control part 24 provided on an inner surface of the cover 15, a first light-emitting diode 25 and a second light-emitting diode 26 provided on the inner surface of the cover 15, a first wiring 27 and a second wiring 28 provided on the inner surface of the cover 15, a second rib 31 which projects from the inner surface of the cover 15 such as to partition the first light-emitting diode 25 and the second light-emitting diode 26 from each other, and a connector 32 provided on the inner surface of the cover 15. The light transmitting portion 23 comprises a first lens 33 corresponding to the first light-emitting diode 25 and a second lens 34 corresponding to the second light-emitting diode 26. The first lens 33 and the second lens 34 are transparent and they are each provided to be put through the cover 15.

The control part 24 is an element which directly controls the light emission of each of the first light-emitting diode 25 and the second light-emitting diode 26. It should be noted here that in this embodiment, there is only one control part 24 provided as a representative example; however the embodiment is not limited to this, but there may be a plurality of control parts 24. The first light-emitting diode 25 and the second light-emitting diode 26 are of the so-called lateral light emission type diodes.

The first light-emitting diode 25 is turned on while, for example, the power is on, whereas it is turned off while the power is off. In the meantime, the second light-emitting diode 26 is turned on when, for example, a communication by wireless LAN is performed, whereas it is off when no communication by wireless LAN is performed. It should be noted that the usage of the first light-emitting diode 25 and the second light-emitting diode 26 is not limited to this, but these diodes may be turned on or turned on and off in a blinking manner when, for example, the built-in hard disk drive or optical disk drive is in operation, or some abnormal event occurs.

The second rib 31 projects from the inner surface of the mask 14 towards an inner side of the housing 22, and it is molded to be integrated with the cover 15. The second rib 31 partitions a first path 35 running from the first light-emitting diode 25 to the light transmitting portion 23 and a second path 36 running from the second light-emitting diode 26 to the light transmitting portion 23 from each other.

As shown in FIGS. 7 and 3, a height of the second rib 31 is larger than a height of the control part 24. Similarly, the height of the second rib 31 is larger than a height of the first light-emitting diode 25 and the second light-emitting diode 26.

The connector 32 can receive the power supplied from the system board 17 via, for example, a flexible cable 37. The second wiring 28 connects the connector 32 and the control part 24 to each other. The connector 32 is connected to the control part 24 via the second wiring 28.

The first wiring 27 connects the control part 24 and the first light-emitting diode 25 to each other, and the control part 24 and the second light-emitting diode 26 to each other. The first wiring 27 and the second wiring 28 are each formed of an electro-conductive adhesive applied onto the inner surface of the mask 14 into a predetermined pattern. The electro-conductive adhesive, which gives rise to the first wiring 27 and the second wiring 28, is applied with, for example, a robot-type dispenser.

According to the fourth embodiment, it becomes not necessary to provide a printed wiring board by which the first light-emitting diode 25 and the control part 24 are mounted, but these members are mounted directly on the inner surface of the housing 22. Thus, the production cost can be cut down. Further, the housing 22 can be made thinner the thickness of the printed wiring board, and therefore the structure of this embodiment can be suitably applied for devices for which there is a great demand of thinning the housing 22, for example, in portable computers, etc. Further, this embodiment is free from the adverse effect such as the tolerance of screw holes made in the printed wiring board, and therefore the accuracy of the installation positions of the first light-emitting diode 25 and the second light-emitting diode 26 can be improved. It should be noted here that for the status indicator 16, a similar structure to that of the second embodiment or third embodiment may be applied.

The electronic device is not limited to the television 11 and the portable computer 41 described in the above-provided embodiments, but it can be naturally applied to some other electronic devices such as mobile telephones and electronic book readers which electronically display pages of books and images, etc. In each of the above-described embodiments, the first wiring 27 and the second wiring 28 are each formed of an electro-conductive adhesive, but each embodiment is not limited to this. For example, the first wiring 27 and the second wiring 28 each may be formed of a conductor pattern formed by, for example, printing a metal paste onto a housing.

Further, the electronic device is not limited directly to the above-described embodiments, but it can be realized while remodifying the structural elements thereof within the scope where the essence thereof remains. Further, various types of embodiments can be achieved by combining or rearranging various structural elements disclosed in the embodiment appropriately. For example, some of the structural elements may be deleted from the entire structure disclosed in the embodiment. Further, structural elements of various versions may be combined together as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising a light-transmitting portion;
   a control part provided on an inner surface of the housing;
   a first light-emitting diode provided on the inner surface of the housing and configured to emit light towards the light-transmitting portion as controlled by the control part;
   a wiring provided in the housing and configured for coupling the control part to the first light-emitting diode;
   a second light-emitting diode provided on the inner surface of the housing and configured to emit light towards the light-transmitting portion as controlled by the control part: and
   a rib projecting from the housing to partition (i) a first path from the first light-emitting diode to the light-transmitting portion from (ii) a second path from the second light-emitting diode to the light-transmitting portion.

2. The electronic device of claim 1, wherein the wiring is formed of an electro-conductive adhesive.

3. The electronic device of claim 1, wherein the light-transmitting portion comprises a first lens aligned with the first light-emitting diode and a second lens aligned with the second light-emitting diode.

4. The electronic device of claim 3, wherein the first light-emitting diode and the second light-emitting diode face a side surface of the housing with the rib extending from the side surface of the housing towards the inner surface of the housing.

5. The electronic device of claim 1, further comprising: a display.

6. The electronic device of claim 5, further comprising: a board which overlaps with the display in a thickness direction of the housing.

7. The electronic device of claim 1, wherein the wiring extends in parallel with the display.

8. An electronic device comprising:
   a housing comprising a light-transmitting portion;
   a first rib projecting from the housing towards an inner side of the housing;
   a control part provided on a surface of the first rib;
   a first light-emitting diode provided on the surface of the first rib and configured to emit light towards the light-transmitting portion as controlled by the control part; and
   a wiring provided on the surface of the first rib and configured to connect the control part and the first light-emitting diode to each other.

9. The electronic device of claim 8, wherein the wiring is formed of an electro-conductive adhesive.

10. The electronic device of claim 9, further comprising:
    a second light-emitting diode provided on the surface of the first rib and configured to emit light towards the light-transmitting portion as controlled by the control part; and
    a second rib projecting from the housing such as to partition a first path from the first light-emitting diode to the light transmitting portion and a second path from the second light-emitting diode to the light transmitting portion from each other.

11. The electronic device of claim 10, wherein the first light-emitting diode and the second light-emitting diode face a side surface of the housing.

12. The electronic device of claim 10, wherein the first light-emitting diode and the second light-emitting diode face a side surface of the housing with the second rib extending from the side surface of the housing towards the surface of the first rib.

13. The electronic device of claim 8, further comprising: a display.

14. The electronic device of claim 13, further comprising: a board which overlaps with the display in a thickness direction of the housing.

15. The electronic device of claim 13, wherein the wiring extends in parallel with the display.

16. The electronic device of claim 8, wherein the light-transmitting portion comprises a first lens aligned with the first light-emitting diode and a second lens aligned with the second light-emitting diode.

17. A television comprising:
    a housing comprising a light-transmitting portion;
    a first rib projecting from the housing towards an inner side of the housing;
    a control part provided on an inner surface of the housing;

a first light-emitting diode provided on a surface of the first rib and configured to emit light towards the light-transmitting portion as controlled by the control part; and a wiring provided on the inner surface of the housing and the surface of the first rib, and configured to connect the control part and the first light-emitting diode to each other.

18. The television of claim 17, wherein the wiring is formed of an electro-conductive adhesive.

19. The television of claim 18, further comprising:

a second light-emitting diode provided on the surface of the first rib and configured to emit light towards the light-transmitting portion as controlled by the control part; and a second rib projecting from the housing such as to partition a first path from the first light-emitting diode to the light transmitting portion and a second path from the second light-emitting diode to the light transmitting portion from each other.

20. The electronic device of claim 19, wherein the first light-emitting diode and the second light-emitting diode face a side surface of the housing with the second rib extending from the side surface of the housing towards the surface of the first rib.

21. The electronic device of claim 17, wherein the light-transmitting portion comprises a first lens aligned with the first light-emitting diode and a second lens aligned with the second light-emitting diode.

* * * * *